E. B. KILLEN.
WHEEL AND WHEEL FITMENT.
APPLICATION FILED MAY 14, 1919.
1,435,529.
Patented Nov. 14, 1922.
4 SHEETS—SHEET 3.
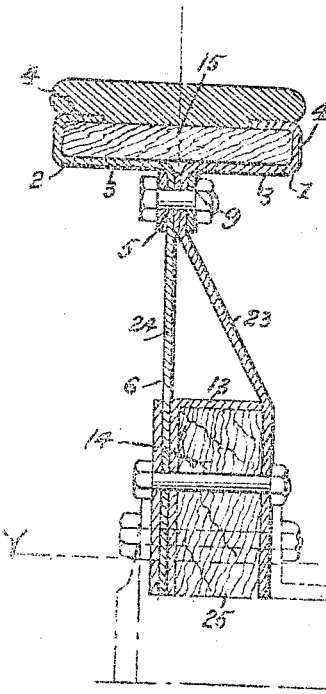
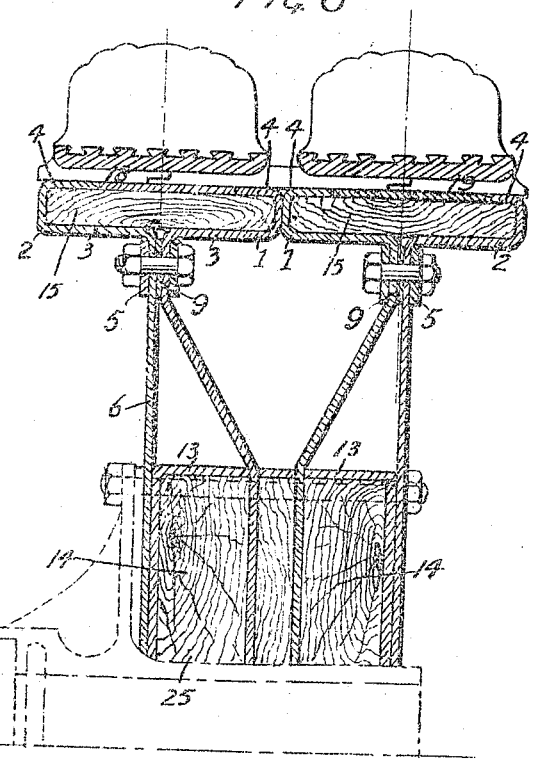
Inventor
Edward Bria Killen.
By B. Singer,
Attorney

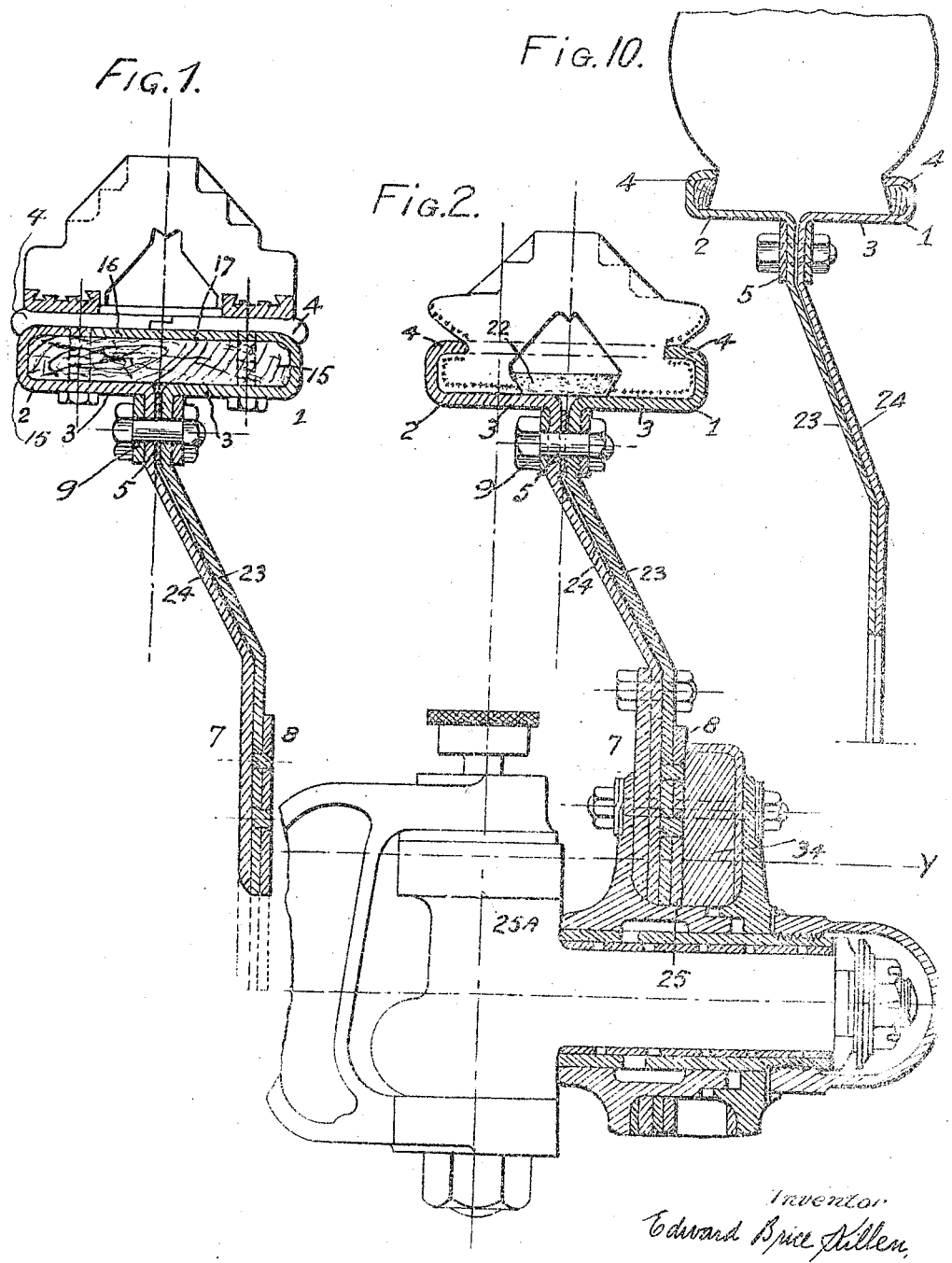

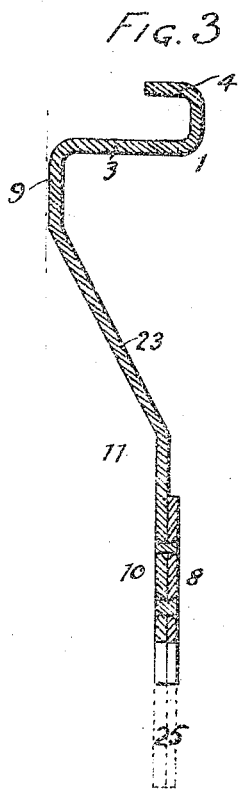
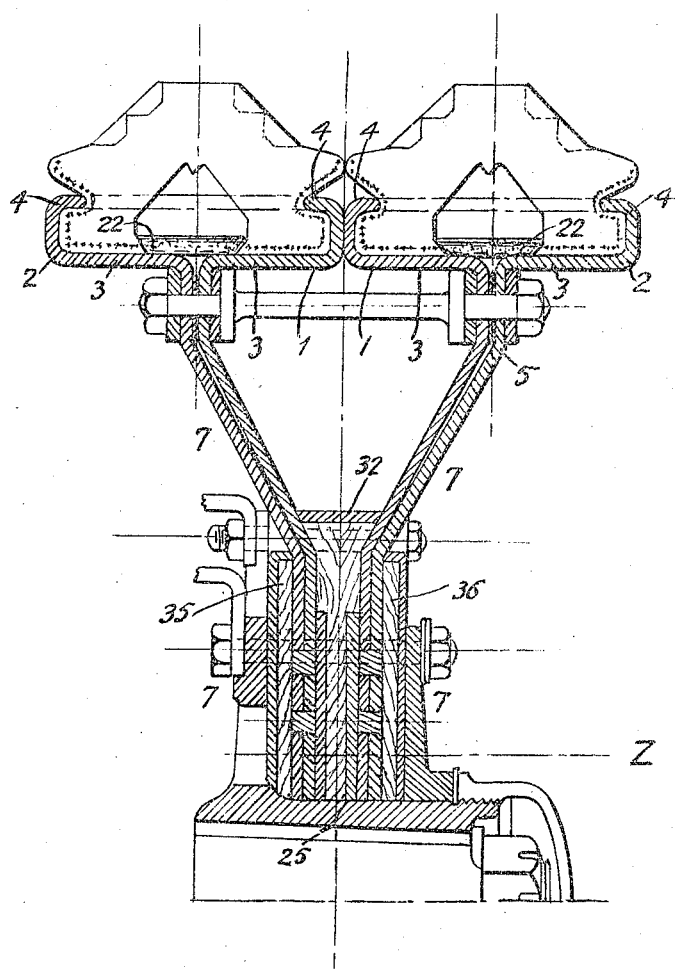

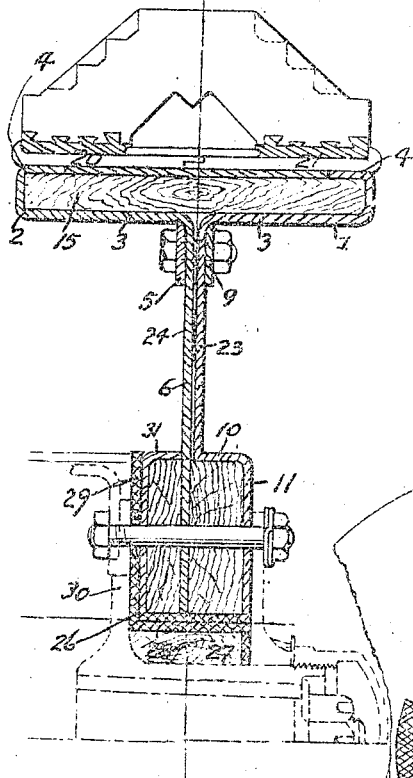
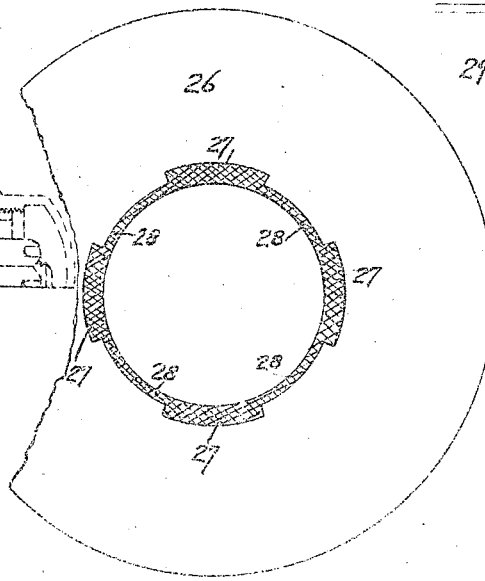
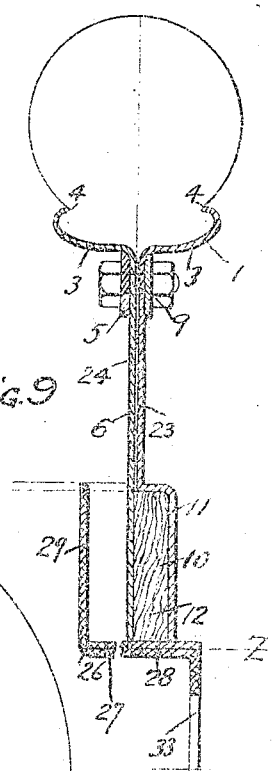

Patented Nov. 14, 1922.

1,435,529

UNITED STATES PATENT OFFICE.

EDWARD BRICE KILLEN, OF LONDON, ENGLAND.

WHEEL AND WHEEL FITMENT.

Application filed May 14, 1919. Serial No. 297,149.

*To all whom it may concern:*

Be it known that I, EDWARD BRICE KILLEN, of 27 Queen Victoria Street, London, England, engineer, have invented certain new and useful Improvements in Wheels and Wheel Fitments, of which the following is a specification.

My invention relates to the construction of wheels and wheel fitments all as hereinafter more particularly described, illustrated in the drawings and pointed out in the claims.

In order that my invention may be properly understood and readily carried into effect, I have hereunto appended four explanatory sheets of drawings of which Figures 1 and 2 are vertical cross sectional views of a dished type of wheel made in accordance with and embodying my invention.

Figure 3 is a similar view of a detached dished plate with strengthening metal disc riveted to it.

Figures 4, 5, 6, 7 and 10 are also vertical cross sectional views of types of wheel embodying my invention, 5, 6, and 7 having a wood felloe part keyed in position.

Figure 8 is a side elevation of a standard hub fitment or axle cover showing driving keys and Figure 9 is a cross section of a hub or axle cover with driving keys all hereafter more fully referred to and described.

The principal part of my wheel proper is constructed from two dishlike stampings, or plates 1 and 2, which I will call the front and back dishlike stampings, of the wheel. Each stamping has a suitable truly circular metal rim part 3, and the metal, after forming the rim runs outwards and may form a suitable hooking flange 4 at the extreme over hanging edge of the rim. The dimensions of the cavity formed between the hooking flanges on the rim, vary according to the type of wheel manufactured, and the special use of the hooks.

The two dishlike stampings when brought together back to back may meet at their central portions on the wheel's centre line and be bolted (or riveted) together back to back (having if wanted a suitable air tight and water tight endless band 5 say $\frac{1}{16}''$ thick fitted between them) at a distance about an inch from their rim portions, see Figures 1, 2, 5, 7 and 10. The metal in the back dishlike stamping, after being bolted (or riveted) to the front dishlike stamping, may run on a vertical line 6 towards the wheel's centre and forms what I will call the back face of the wheel proper, see Figures 5, 7 and 10, or on the face of the back stamping I may form a suitable central cavity 7 which I will call the adjusting central cavity of the wheel, and when this adjusting cavity is formed on the face of the back stamping, the two stampings may run suitably together side by side to the wheel centre, forming a single dished wheel constructed principally from two dished plates, and the front dishlike stamping may have a suitable strengthening metal disc 8 riveted to it, thereby strengthening the wheel centrally, see Figures 1, 2 and 3.

In the front dishlike stamping the metal, after forming the rim, may run for about 2 inches in a vertical line 9 towards the wheel's centre, and then side by side with the metal of the back dished stamping, forming a boss cavity centrally on both stampings or plates instead of on the front stamping only. The depth of this boss cavity 10 in the front stamping may be from say 1 to 2¼ or more inches, according to the type of wheel manufactured, see Figures 3, 7 and 10, and the diameter of the bottom of the cavity 10 may be from 6 to 16 inches, but these dimensions vary according to the special work for which the wheel is required. The boss cavity in the front stamping may be stamped in varying depths and shapes see Figures 3, 7 and 10, and when the back stamping 2 of the wheel runs in a vertical line 6 towards the wheel's centre, and there is no adjusting central cavity stamped on the wheel's back face, I may have wood 12 see Figures 7 and 10, keyed within the boss cavity of the front dishlike stamping, and when there is no adjusting cavity formed on the back dishlike stamping 2, I may fit within the boss cavity of the front stamping and between the two main stampings what I will call a compound central distance piece which may be constructed in any suitable shape and of suitable materials, from say a metal pressing 13 having a suitable outer rim part; wood 14 or its equivalent, being preferably keyed within the metal pressing. The compound distance piece as it lies between the two dishlike stampings 1 and 2 of the wheel, forms a strong and solid driving central part for the wheel see Figures 5 and 6.

The construction of the outer rim portions formed on the front and back dishlike stampings enables the wheel proper to become a clamping or keying device, and allows, when wanted a suitable wood felloe part 15 to be keyed in position over the rim, see Figures 1, 5, 6 and 7, by means of the wheel's clamping or hooking outer flanges. The wood felloe assists the metal stampings or plates to stand severe vibration, without becoming prematurely fatigued, and also enables one or more suitable endless metal bonding or tyre retaining rims 16 and 17, Figure 1 and 18—19, Figure 6 and 20—21, Figure 7, to be suitably mounted and again demounted over the wheel without injuring the wheel, and facilitates the mounting and demounting of practically any endless bonding or tyre retaining rim or rims over the wood felloe part and also enables two single wheels to be used to form one abnormally wide single wheel, see Figure 6.

The construction of the wheel's rim with a wood felloe part 15 enables a wheel to be built having abnormally strong right and left circumferential edges which are capable of resisting distortion from kerbstones or elsewhere, and also enables rubber tyres to be keyed to the wheel by means of detachable metal bonding rims which may form the equivalent of endless wedges when fitted over the wheel, see 16 and 17 Figure 1 and 18—19, Figure 6 and 20—21 Figure 7. This type of wheel is specially suitable when solid rubber band, or such like tyres, are fitted and held to a wheel by means of great compression, and the edges of the detachable metal bonding rims 16—17, 18—19, 20 and 21 may be constructed to partly take the kerbstone shocks see Figures 1, 6 and 7.

For many types of resilient tyres, and specially for lighter traffic, the right and left metal stampings may be used to form a wheel without having a wood felloe part and the extreme clamping flanges be formed at the overhanging edges to hook or clamp a tyre or a tyre cover to the rim portions of the two dishlike stampings, see Figures 2 and 10, the tyre being easily fitted or clamped under compression to the wheel's divisible rim, or its equivalent, by bringing the two clamping stampings 1 and 2 close together back to back and having when wanted a suitable distance piece 22 fitted between the base beads.

Four or more suitable lightening holes 23 and 24 are preferably formed in suitable positions on the front and back stampings of the disc wheel, see Figures 1, 2, 5, 7 and 10. These holes in the wheel not only give to the wheel a light appearance, but they enable positions within the wheel to be easily got at, and facilitate the divisibility of the wheel proper, and when inflated tyres are used, they enable the air valve to be easily got at and suitably fitted at the wheel's rim see Figure 10.

This type of wheel may be constructed and standardized in various shapes and dimensions, see Figures 1, 2, 5, 6, 7 and 10, to suit practically all the varying types of chassis used throughout the world, regardless of their varying hub dimensions, and a centre hole 25 may be bored in each wheel to fit practically any hub. The construction of the wheel allows the centre line of the tyre to be fitted either close up or far away from the chassis frame as required, to suit the different types of chassis and bodies on the market, and the dished divisible type of wheel is specially suitable for front steering wheels, see Figures 1 and 2, because it enables the road contact of the front steering tyres to be brought towards a vertical line 25A passing through the steering pivot, without any detriment to tyre wear and tear, see Figure 2 and two single wheels when put together back to back, with a suitable distance piece 32 between, form a twin wheel, see Figure 4.

When this wheel is used for a divisible wheel for inflated tyres a slot or channel is made at the circumference of each stamping to take the air valve, which passes suitably between the two stampings and into one of the wheel lightening holes, and a suitable endless unstretchable distance piece 22 may be fitted between the base beads of either an air cushion tyre see Figures 2 and 4, or between the base beads of an inflated type of tyre as shown in Figure 10, dispensing with security bolts and facilitating the easy mounting and demounting of both air cushion or inflated tyres. The wheel may be divisible, reversible, detachable, and interchangeable, enabling many existing tyre troubles to be easily and quickly overcome and the rim portion of the wheel may be manufactured to take practically all types of tyres on the market, including standard inflated tyre covers, see Figure 10, (whether manufactured with the beaded edge or with the straight side or wired type) rubber cushion, air cushion, see Figures 2 and 4; solid rubber band see Figure 6; or metal tyres see Figure 5.

With this wheel proper I may use what I will call a standardized hub fitment or cover see Figures 7, 8 and 9, which enables practically all existing types of nonstandardized hubs, or their equivalent, to be standardized or made the equivalent of standardized hubs, and at the same time strengthens each converted hub (including its fixed hub plate 30 see Figure 7). By using say two standardized diameter hub fitments or covers the larger having a circular rim of say 6¼ inches see Figures 7, 8 and 9 and the line YZ in both sheets of drawings, showing how a standardized diameter of centre hole can be easily bored in varying types of wheels by making the diameter of the centre holes all alike; and the smaller having a standardized barrel bed of say between 3 and 5 inches in diameter practically all types of wheels having the same diameter centre hole may be manufactured not only detachable, but interchangeable from one type of chassis to another. Each universal hub fitment of cover 26 is preferably constructed from a dishlike metal stamping having say a standardized barrel bed circumference part YZ over which many varying dimensions of road wheels may be easily fitted and interchanged, provided the centre hole of each road wheel is standardized to suit, and snugly fit over the barrel bed YZ of a standard hub cover 26 driving key bars or projections 27 formed to the correct arc of a circle may be securely attached to or formed on the standardized barrel bed circumference 28 of the hub fitment or cover, see Figures 7, 8 and 9, at say equal distances apart from each other. These key bars 27 forming projections and slots on the barrel bed 28, may be 4 in number and ¼ inch in height, see Figure 8, and they enable the inner circumference of practically all wheels which are constructed having corresponding slots and projections formed on their centre holes, to be interchanged and keyed in position over the standardized hub fitments or covers 26. The standardized hub fitments or covers may be rigidly riveted or attached to practically all non-standardized hubs, and when fitted they take the drive between the wheel proper and the hub or axle fitment, thereby taking the driving strain off the attachment hub bolts, or other driving device. This standardized hub fitment or cover is constructed with a suitable back flange 29 which extends outwards at what I call the back of its barrel bed, to which flange the fixed plate 30 of an existing hub may be suitably attached or riveted, see Figure 7. An additional suitable distance piece 31 or metal disc may be fitted between the wheel and the outward flange 29 of the hub cover when required and a front flange 33 which runs inward may be formed on the standardized hub cover to fit over say the barrel of the nonstandardized hub, or hub shell, or equivalent, see Figures 7 and 10.

The wheel proper may be built light having its outer and inner circumferences practically indistortable, and with or without wood, as required, according to the type of work for which the wheel is wanted the entire wheel whether built with or without wood, being abnormally strong both vertically and laterally.

The construction of the wheel enables the centre line of the tyre to be fitted close up to or away from the chassis frame as required by adjusting the centre line of the wheels, circumference nearer to or farther away from the said chassis frame and using a suitable distance piece 34 Figure 2, 35 and 36 see Figure 4.

This type of wheel and wheel fitment may be manufactured and stocked in large quantities without any risk of the standardized parts becoming obsolete, because they may be used on practically all types of chassis, and different diameters and widths of tyre retaining rims may be suitably fitted over my standardized disc wheel by using suitable wood felloe parts.

When twin tyres are used on the back axle and singles on the front, six of my standard wheels with tyre attached, may be used and interchanged with each other on the back and front axles of a chassis and two single wheels when put together, one being reversed with a suitable distance piece, say 32 between, form a twin wheel, see Figures 2 and 4. This type of wheel enables twin tyres on the back and singles on the front to be easily and quickly interchanged with each other practically anywhere by unskilled labour, and the wheel may be constructed in varying dimensions and shapes and used with or without my standardized hub or axle fitment 26 but when a standardized hub fitment is used, practically all tyre and wheel dimensions may be constructed to be easily changed or interchanged on varying types of chassis, using existing hubs, hub shells, or axles, provided the central hole of each wheel has a standard diameter, see the line YZ in both sheets of drawings, and is constructed to snugly fit over the rim of the hub cover. An important feature of the invention is that the centre line of the tyres attached may be advantageously fitted very close up to the chassis frame, see Figures 2, 5, 7 and 10, without scrapping existing hubs.

In this invention I do not confine myself to the dimensions given in the specification as the wheels and wheel fitments (including my standardized hub or axle covers, and distance pieces) may be constructed in all required dimensions, shapes and of suitable materials.

Claims.

1. An adjustable disc wheel with a front and back face dish-like stamping and a strengthening endless central fitment, the two stampings being divisibly attached back to back and forming a clamping rim.

2. An adjustable disc wheel with a front and back dishlike stamping, each stamping having a centre hole and a rim portion which ends in a hooking flange, the two stampings being divisibly attached back to back and forming a clamping rim, one of said stampings having an offset portion which forms a boss part on the wheel's front face.

3. An adjustable disc wheel with a front and back dishlike stamping, each stamping having a centre hole and a rim portion which ends in a hooking flange, the two stampings being divisibly attached back to back and forming a clamping rim.

4. An adjustable disc wheel comprising front and back face dish-like stampings, a strengthening endless central fitment, said dish-like stampings being divisibly attached back to back and forming a clamping rim, a key and lock wood felloe part held in said clamping rim, and endless metal rims and tires on said felloe part.

5. A wide disc wheel comprising a pair of wheels each having a front and back face dish-like stamping and a strengthening endless central fitment, the two stampings being divisibly attached back to back and forming a clamping rim, said wheels being arranged side to side and with their convex faces opposed to each other.

In testimony whereof I affix my signature in presence of two witnesses.

EDWARD BRICE KILLEN.

Witnesses:
JOHN LIDDLE,
JOHN TRAIN LIDDLE.